US 010714718B2

(12) United States Patent
Oishi et al.

(10) Patent No.: US 10,714,718 B2
(45) Date of Patent: Jul. 14, 2020

(54) BATTERY PACK

(71) Applicant: KABUSHIKI KAISHA TOYOTA JIDOSHOKKI, Aichi-ken (JP)

(72) Inventors: Hidefumi Oishi, Kariya (JP); Takayuki Kato, Kariya (JP)

(73) Assignee: KABUSHIKI KAISHA TOYOTA JIDOSHOKKI, Aichi-ken (JP)

(*) Notice: Subject to any disclaimer, the term of this patent is extended or adjusted under 35 U.S.C. 154(b) by 258 days.

(21) Appl. No.: 15/302,249

(22) PCT Filed: Feb. 27, 2015

(86) PCT No.: PCT/JP2015/055753
§ 371 (c)(1),
(2) Date: Oct. 6, 2016

(87) PCT Pub. No.: WO2015/159595
PCT Pub. Date: Oct. 22, 2015

(65) Prior Publication Data
US 2017/0033340 A1    Feb. 2, 2017

(30) Foreign Application Priority Data

Apr. 18, 2014  (JP) ................................ 2014-086854

(51) Int. Cl.
| | |
|---|---|
| *H01M 2/10* | (2006.01) |
| *B60J 10/235* | (2016.01) |
| *B60R 13/06* | (2006.01) |

(52) U.S. Cl.
CPC ....... *H01M 2/1094* (2013.01); *H01M 2/1077* (2013.01); *B60J 10/235* (2016.02); *B60R 13/06* (2013.01); *H01M 2220/20* (2013.01)

(58) Field of Classification Search
CPC .... H01M 2/1094; H01M 2/10; H01M 2/1077; H01M 2220/20; B60J 10/235; B60R 13/06
See application file for complete search history.

(56) References Cited

U.S. PATENT DOCUMENTS

| | | | | |
|---|---|---|---|---|
| 2008/0220315 | A1* | 9/2008 | Dougherty | .......... H01M 2/1077 |
| | | | | 429/53 |
| 2008/0311474 | A1* | 12/2008 | Ryou | ................. H01M 2/0222 |
| | | | | 429/229 |

(Continued)

FOREIGN PATENT DOCUMENTS

| | | | | |
|---|---|---|---|---|
| CN | 203423217 | * | 2/2014 | .............. H01M 2/02 |
| DE | 102015217076 | * | 3/2017 | .............. H01M 2/06 |

(Continued)

OTHER PUBLICATIONS

JP 2005-3399995 Derwent and English Machine translation 2005.*

(Continued)

*Primary Examiner* — Jonathan G Leong
*Assistant Examiner* — Aaron J Greso
(74) *Attorney, Agent, or Firm* — Greenblum & Bernstein, P.L.C.

(57) ABSTRACT

A battery pack has a case. The case has battery cells received therein. The case has a closed-bottom cylindrical case body and a flat plate-shaped lid body. Each of the walls of the case body has an end surface surrounding the opening of the case body. A seal member is provided to the end surfaces of the walls. The seal member has an inner overlapping portion and an outer overlapping portion, which overlap each other. Because of the presence of a sixth bend, the inner overlapping portion has restoring force acting toward the outer overlapping portion.

13 Claims, 4 Drawing Sheets

(56) References Cited

U.S. PATENT DOCUMENTS

| | | | | |
|---|---|---|---|---|
| 2012/0164500 A1* | 6/2012 | Loo | ................... | H01M 2/1072 |
| | | | | 429/82 |
| 2012/0251863 A1* | 10/2012 | Berger | ................ | H01M 2/1083 |
| | | | | 429/99 |
| 2013/0078888 A1* | 3/2013 | Mayer | ................. | A63H 33/003 |
| | | | | 446/433 |

FOREIGN PATENT DOCUMENTS

| | | | | |
|---|---|---|---|---|
| JP | H01-082457 | * | 3/1989 | .............. H01M 4/06 |
| JP | 2005-339995 | * | 12/2005 | .............. H01M 2/08 |
| JP | 2008-251352 | | 10/2008 | |

OTHER PUBLICATIONS

Slocum (Text-book on the Strength of Materials © 1906 Ginn and Company Boston USA) 1906—Taken as December.*
Elastic region RTP Company (Definitions :{http://web.rtpcompany.com/info/data/definitions.htm Online date May 20, 2014.*
DE 102015217076 Derwent Abstract printed Sep. 20, 2009.*
International Search Report, along with English-language translation thereof, in Appl. No. PCT/JP2015/055753 dated May 19, 2015.
Written Opinion of the International Searching Authority, along with English-language translation thereof, in Appl. No. PCT/JP2015/055753 dated May 19, 2015.
International Preliminary Report on Patentability in Appl. No. PCT/JP2015/055753 dated Oct. 18, 2016.

* cited by examiner

BATTERY PACK

TECHNICAL FIELD

The present invention relates to a battery pack.

BACKGROUND ART

Patent document 1 describes one example of a battery pack. The battery module described in patent document 1 includes batteries (battery cells) and a module case that accommodates the batteries.

Liquid, such as water, or dust that enters the case may short-circuit the battery cells and cause failures in the battery cells. It is thus desired that the sealing properties of the case be improved.

PRIOR ART DOCUMENT

Patent Document

Patent Document 1: Japanese Laid-Open Patent Publication No. 2008-251352

SUMMARY OF THE INVENTION

Problems that are to be Solved by the Invention

It is an object of the present invention to provide a battery pack that improves the sealing properties of a case.

Means for Solving the Problem

To achieve the above object, one aspect of the present invention provides a battery pack including a battery cell and a case that accommodates the battery cell. The case includes a case body including an opening. A lid is fixed to the case body. The lid closes the opening. An elongated, elastic seal is held between the lid and an end surface of the case body surrounding the opening. The seal is bent in conformance with the shape of the opening. The seal includes an inner overlapping portion, an outer overlapping portion overlapped with the inner overlapping portion and located toward the outer side from the inner overlapping portion, and an inner bent portion that produces resilient force acting on the inner overlapping portion so that the inner overlapping portion is pushed against the outer overlapping portion.

The sealing of a case may be obtained by bending and arranging an elongated seal between a case body and a lid. In this case, portions of the seal need to overlap each other so that there is no gap between the case body and the lid. When there is a gap between the inner overlapping portion and the outer overlapping portion, the sealing of the case cannot be obtained. In this regard, the above configuration pushes the inner overlapping portion against the outer overlapping portion with the resilient force acting on the inner overlapping portion. This improves the adhesion of the inner overlapping portion and the outer overlapping portion. Thus, the formation of gaps is limited between the inner overlapping portion and the outer overlapping portion. This improves the sealing between the case body and the lid. That is, the sealing of the case is improved.

EMBODIMENTS OF THE INVENTION

A battery pack according to one embodiment of the present invention will now be described with reference to FIGS. 1 to 3. In the description hereafter, the upper and lower directions are the upper and lower directions in the vertical direction.

Figure 1:
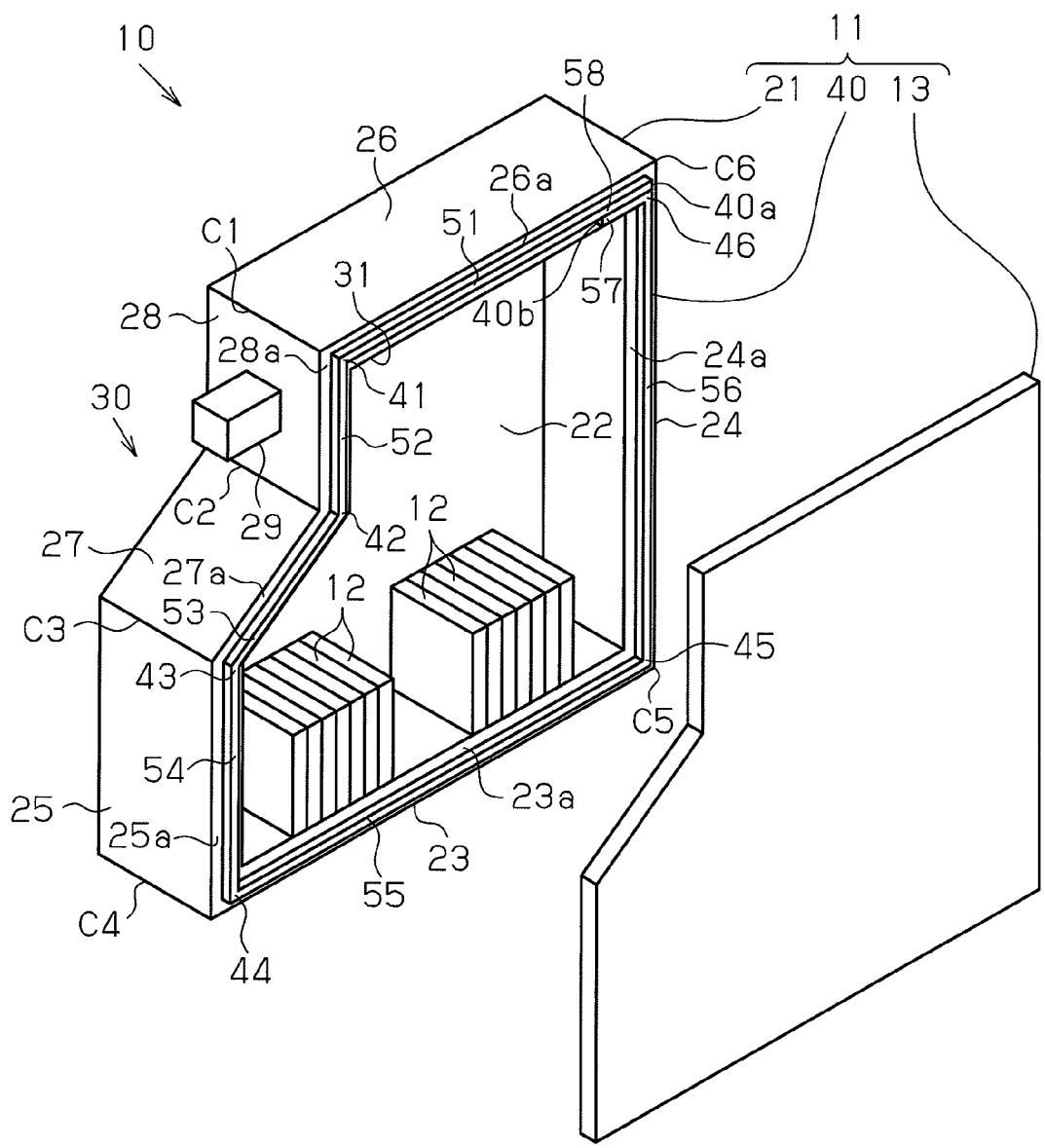
FIG. 1 is an exploded perspective view showing a battery pack according to one embodiment of the present invention.

As shown in FIG. 1, a battery pack 10 includes a case 11. The case 11 accommodates battery cells 12. The case 11 includes a case body 21, which is hollow and has a closed end, a flat lid 13, and a seal 40. The seal 40 is located between the case body 21 and the lid 13. The case body 21 includes a flat base 22 and six flat rectangular walls 23 to 28. The walls 23 to 28 each extend from the edge of the base 22 in the thickness-wise direction of the base 22.

Figure 2:
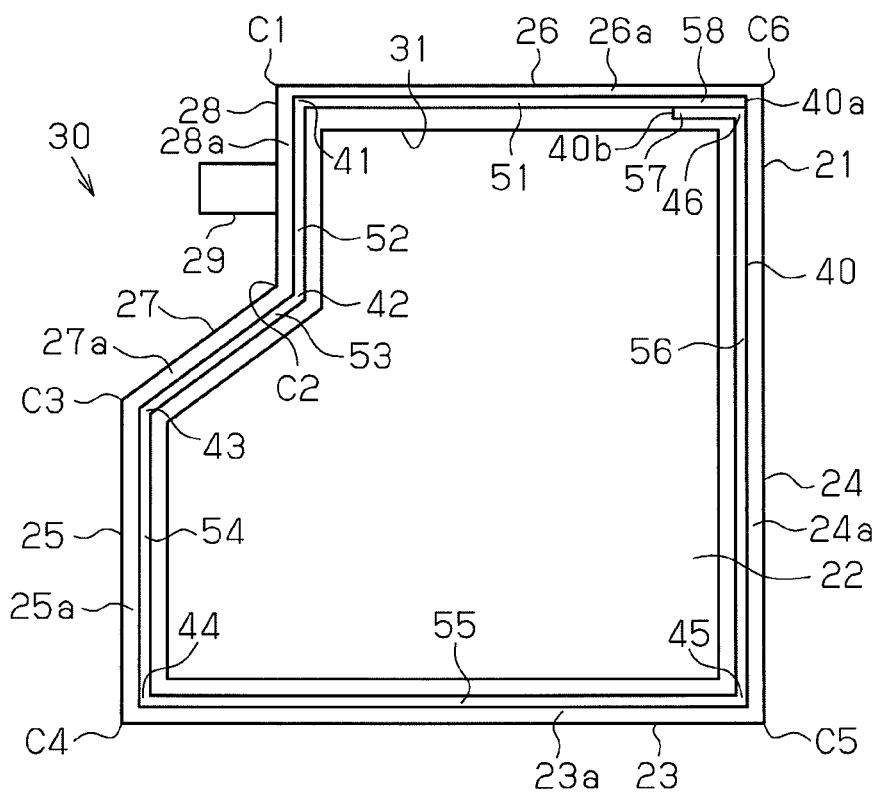
FIG. 2 is a front view showing a case body of the battery pack.

As shown in FIG. 2, a first side wall 24 and a second side wall 25 are respectively arranged on the two longitudinal ends of a lower wall 23. The first and second side walls 24 and 25 extend in the thickness-wise direction of the lower wall 23. The first side wall 24 is longer than the second side wall 25. An upper wall 26 is arranged on the first side wall 24 at the end opposite to the lower wall 23. The upper wall 26 extends in the thickness-wise direction of the first side wall 24. The lower wall 23 is opposed to the upper wall 26. The upper wall 26 is shorter than the lower wall 23. An inclined wall 27 is arranged on the second side wall 25 at the end opposite to the lower wall 23. The inclined wall 27 extends diagonally toward the first side wall 24 and the upper wall 26. A third side wall 28 connects the inclined wall 27 and the upper wall 26. In this manner, the walls 23 to 28 are connected in a frame-like form. The second side wall 25 and the third side wall 28 are opposed to the first side wall 24. The case 11 is arranged so that the lower wall 23 is located toward the lower side and the upper wall 26 is located toward the upper side.

A connector 29 is arranged on the third side wall 28. The connector 29 projects from the third side wall 28 toward the outer side of the case 11. A harness or the like (not shown) electrically connects the connector 29 to the battery cells 12. The third side wall 28 is located between the second side wall 25 and the first side wall 24. The third side wall 28 and the inclined wall 27 form a recess 30 that is recessed into the case 11. The region surrounded by the inclined wall 27 and the third side wall 28 in the recess 30 defines a region in which the connector 29 is arranged.

The case body 21 includes an opening 31 surrounded by the walls 23 to 28. The walls 23 to 28 respectively include end surfaces 23a to 28a surrounding the opening 31. A seal 40 is attached to the end surfaces 23a to 28a of the walls 23 to 28. The seal 40 is manufactured from an elastic material such as a rubber or resin sponge. The seal 40 is formed by a single elongated rod that is bent in conformance with the shape of the opening 31. The seal 40 is arranged to surround the opening 31. The lid 13, which closes the opening 31 of the case body 21, is fixed to the walls 23 to 28. The seal 40 is squeezed when held between the lid 13 and the end surfaces 23a to 28a of the walls 23 to 28. This ensures the sealing between the case body 21 and the lid 13, that is, the sealing of the case 11.

The seal 40 includes six bent portions 41 to 46. The first bent portion 41 is bent at a corner C1 where the upper wall 26 and the third side wall 28 intersect. The second bent portion 42 is bent at a corner C2 where the third side wall 28 and the inclined wall 27 intersect. The third bent portion 43 is bent at a corner C3 where the inclined wall 27 and the second side wall 25 intersect. The fourth bent portion 44 is bent at a corner C4 where the second side wall 25 and the lower wall 23 intersect. The fifth bent portion 45 is bent at a corner C5 where the lower wall 23 and the first side wall 24 intersect. The sixth bent portion 46 is bent at a corner C6 where the first side wall 24 and the upper wall 26 intersect.

The seal 40 includes a first end 40a at one longitudinal end and a second end 40b at the other longitudinal end. The seal 40 includes an upper portion 51 between the first end 40a and the first bent portion 41. The upper portion 51 is arranged along the end surface 26a of the upper wall 26. The seal 40 includes a side portion 52 between the first bent portion 41 and the second bent portion 42. The side portion 52 is arranged along the end surface 28a of the third side wall 28. The seal 40 includes an inclined portion 53 between the second bent portion 42 and the third bent portion 43. The inclined portion 53 is arranged along the end surface 27a of the inclined wall 27. The seal 40 includes a side portion 54 between the third bent portion 43 and the fourth bent portion 44. The side portion 54 is arranged along the end surface 25a of the second side wall 25. The seal 40 includes a lower portion 55 between the fourth bent portion 44 and the fifth bent portion 45. The lower portion 55 is arranged along the end surface 23a of the lower wall 23. The seal 40 includes a side portion 56 between the fifth bent portion 45 and the sixth bent portion 46. The side portion 56 is arranged along the end surface 24a of the first side wall 24.

Figure 3:
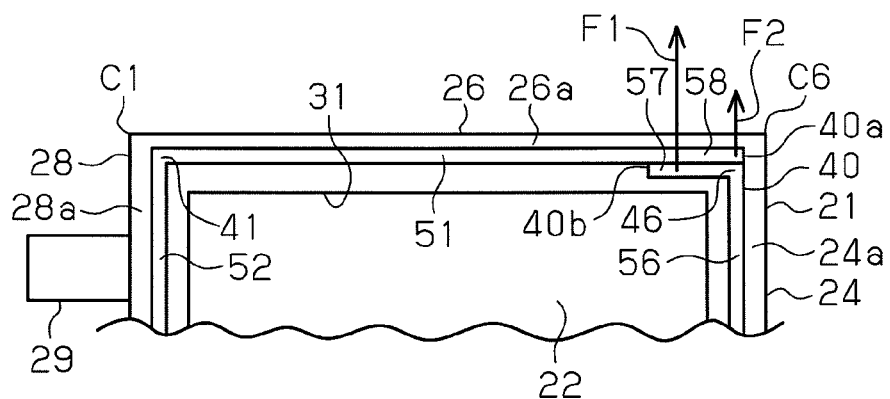
FIG. 3 is an enlarged, partial plan view showing an inner overlapping portion and an outer overlapping portion of a seal.

As shown in FIG. 3, the seal 40 includes an inner overlapping portion 57 between the sixth bent portion 46 and the second end 40b. The inner overlapping portion 57 is arranged along the end surface 26a of the upper wall 26. The inner overlapping portion 57 is located toward the inner side from the upper portion 51. The inner overlapping portion 57 is smaller in length than the upper portion 51. The inner overlapping portion 57 is in contact with part of the upper portion 51. The upper portion 51 includes an outer overlapping portion 58 at the location overlapping the inner overlapping portion 57. The outer overlapping portion 58 is arranged along the end surface 26a of the upper wall 26. The outer overlapping portion 58 is located outward from the inner overlapping portion 57. The outer overlapping portion 58 covers the sixth bent portion 46 from above. The inner overlapping portion 57 and the outer overlapping portion 58 are arranged on the end surface 26a, which is located at the highest position among the end surfaces 23a to 28a of the walls 23 to 28.

The seal 40 is elastic. Thus, when bending the seal 40, resilient force acts on the seal 40 to restore its original form. Resilient force F1 that acts on the inner overlapping portion 57 is produced by the sixth bent portion 46, which is closest to the inner overlapping portion 57. The sixth bent portion 46 is bent from the end surface 24a of the first side wall 24 to the end surface 26a of the upper wall 26. Resilient force F1 acts on the inner overlapping portion 57 toward the outer side so that the inner overlapping portion 57 and the side portion 56 become straight. Thus, the resilient force F1 of the inner overlapping portion 57 acts on the outer overlapping portion 58. Accordingly, the sixth bent portion 46 is an inner bent portion that causes resilient force F1 to act on the inner overlapping portion 57 so that the inner overlapping portion 57 is pushed against the outer overlapping portion 58.

Further, resilient force F2 acts on the outer overlapping portion 58. Resilient force F2 is produced by the first bent portion 41, which is the bent portion closest to the upper portion 51 that includes the outer overlapping portion 58. Resilient force F2 acts on the outer overlapping portion 58 so that the outer overlapping portion 58 and the side portion 52 become straight. In this manner, resilient force acts on the inner overlapping portion 57 and the outer overlapping portion 58 in the same direction. Further, resilient force F2 acts on the outer overlapping portion 58 in a direction extending away from the inner overlapping portion 57.

The resilient force acting on the seal 40 is in accordance with the distance from the bent portions 41 to 46. More specifically, as the distance decreases from each of the bent portions 41 to 46, the resilient force that acts on the seal 40 increases. The resilient force F1 that acts on the inner overlapping portion 57 is in accordance with the distance from the sixth bent portion 46. The resilient force F2 that acts on the outer overlapping portion 58 is in accordance with the distance from the first bent portion 41. The distance from the first bent portion 41 to the outer overlapping portion 58 is greater than the distance from the sixth bent portion 46 to the inner overlapping portion 57. Thus, the resilient force F2 acting on the outer overlapping portion 58 is smaller than the resilient force F1 acting on the inner overlapping portion 57. Accordingly, even when resilient force acts in the same direction on the inner overlapping portion 57 and the outer overlapping portion 58, the inner overlapping portion 57 is pushed against the outer overlapping portion 58.

The operation of the battery pack 10 will now be described.

When sealing the case body 21 and the lid 13, the elongated seal 40 is bent and arranged between the case body 21 and the lid 13. In this case, the seal 40 is arranged surrounding the opening 31 without any gap between the case body 21 and the lid 13. The seal 40 is arranged so as to form the inner overlapping portion 57 and the outer overlapping portion 58 that overlap each other. Here, sealing may not be obtained when a gap forms between the inner overlapping portion 57 and the outer overlapping portion 58.

In the present embodiment, resilient force F1 acts on the inner overlapping portion 57 toward the outer overlapping portion 58. As a result, the inner overlapping portion 57 is pushed against the outer overlapping portion 58. This improves the adhesion of the inner overlapping portion 57 and the outer overlapping portion 58. Thus, the formation of gaps is limited between the inner overlapping portion 57 and the outer overlapping portion 58. This improves the sealing properties between the case body 21 and the lid 13.

Accordingly, the above embodiment has the advantages described below.

(1) Resilient force F1 acts on the inner overlapping portion 57 toward the outer overlapping portion 58. This improves the adhesion of the inner overlapping portion 57 and the outer overlapping portion 58 and improves the sealing properties of the case 11. Thus, the entrance of liquid and dust from the outside into the case 11 is limited. This reduces short-circuiting of the battery cells 12.

(2) The inner overlapping portion 57 and the outer overlapping portion 58 are overlapped with each other at the uppermost portion of the case 11. The battery pack 10 may be accommodated in an accommodation portion of a vehicle or the like. In such a case, when the inner overlapping portion 57 and the outer overlapping portion 58 are located at the lower portion of the case 11, the liquid that collects in the accommodation portion is apt to entering the case 11. In this regard, the inner overlapping portion 57 and the outer overlapping portion 58 are located at the uppermost portion of the case 11. Thus, the entrance of the liquid, which is collected in the accommodation portion, into the case 11 is limited.

(3) The outer overlapping portion 58 covers the sixth bent portion 46 from the upper side. When the outer overlapping portion 58 does not cover the sixth bent portion 46, liquid may collect between the sixth bent portion 46 and the inner overlapping portion 57. Further, liquid may enter the joint between the inner overlapping portion 57 and the outer overlapping portion 58. In this regard, the outer overlapping portion 58 extends to the location where it covers the sixth bent portion 46. This prevents the collection of liquid near the joint of the inner overlapping portion 57 and the outer overlapping portion 58. Thus, the entrance of liquid into the case 11 may be prevented.

The above embodiment may be modified as described below.

Figure 4:
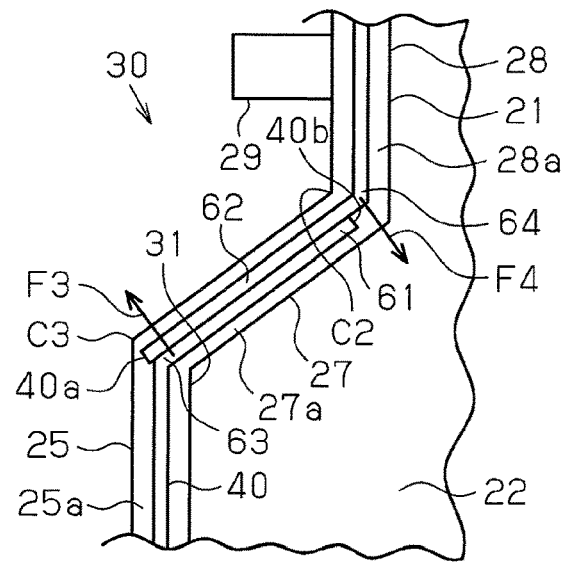
FIG. 4 is an enlarged, partial plan view showing an inner overlapping portion and an outer overlapping portion of a seal in a modified example.

As shown in FIG. 4, an inner overlapping portion 61 and an outer overlapping portion 62 may be arranged on the end surface 27a of the inclined wall 27. An inner bent portion 63 bent at the corner C3 produces resilient force F3 that acts toward the outer side on the inner overlapping portion 61. An outer bent portion 64 bent at the corner C2 produces resilient force F4 that acts toward the inner side on the outer overlapping portion 62. In this manner, resilient force acts on the inner overlapping portion 61 and the outer overlapping portion 62 in directions extending toward each other. This improves the adhesion between the inner overlapping portion 61 and the outer overlapping portion 62 and further improves the sealing properties of the case 11.

Further, the inclined wall 27 is one of the walls that define the recess 30. The inclined wall 27 is free from the connector 29. The seal 40 is arranged in two layers where the inner overlapping portion 61 and the outer overlapping portion 62 are located. Thus, the end surface of the wall of the case 11 where the inner overlapping portion 61 and the outer overlapping portion 62 are arranged needs to have a wider area. In this case, the wall may be increased in thickness to increase the area of the end surface. However, this may interfere with the arrangement of members other than the battery pack 10 and is not desirable. In this regard, the walls that define the recess 30 in which the connector 29 is arranged has advantages that will now be described. A clearance is provided between the connector 29 and the walls to restrict contact with the connector 29. Further, other members are not arranged in the clearance. Thus, the walls that define the recess 30 may easily be increased in thickness. As a result, interference in the arrangement of other members is limited even when the inclined wall 27, which is where the inner overlapping portion 61 and the outer overlapping portion 62 are arranged, is increased in thickness.

Figure 5:
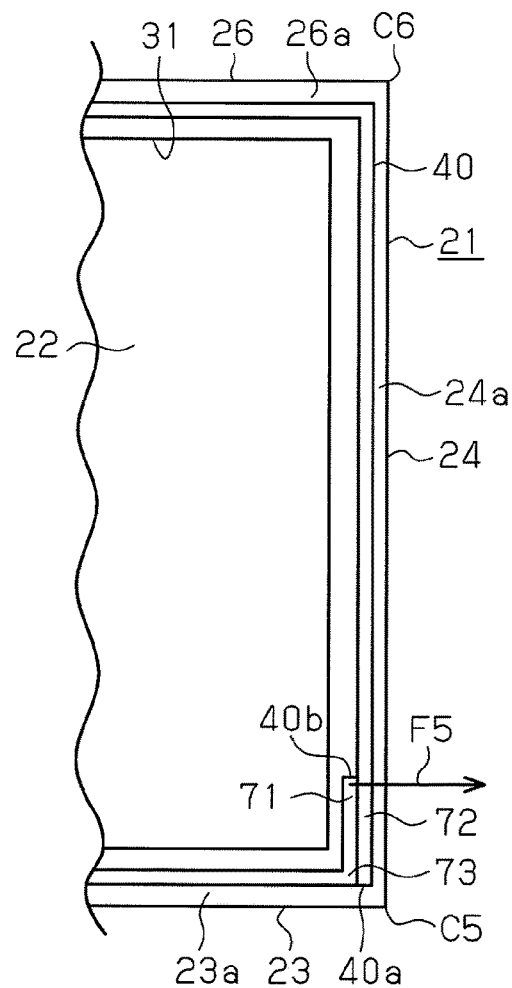
FIG. 5 is an enlarged, partial plan view showing an inner overlapping portion and an outer overlapping portion in a modified example.

As shown in FIG. 5, an inner overlapping portion 71 and an outer overlapping portion 72 may be arranged on the first side wall 24. An inner bent portion 73 that is bent at the corner C5 produces resilient force F5 that acts toward the outer side on the inner overlapping portion 71. This improves the adhesion of the inner overlapping portion 71 and the outer overlapping portion 72 and further improves the sealing properties of the case 11. In this case, it is preferred that the inner overlapping portion 71 extend toward the upper side and that the outer overlapping portion 72 extend toward the lower side. When the inner overlapping portion 71 extends toward the lower side and the outer overlapping portion 72 extends toward the upper side, the joint of the inner overlapping portion 71 and the outer overlapping portion 72 will be exposed toward the upper side. Since liquid moves from the upper side toward the lower side, liquid would be apt to enter the case 11 from the upwardly exposed joint. In this regard, since the inner overlapping portion 71 extends toward the upper side and the outer overlapping portion 72 extends toward the lower side, the joint is not exposed to the outside in the upper direction. This prevents the entrance of liquid into the case 11.

Figure 6:
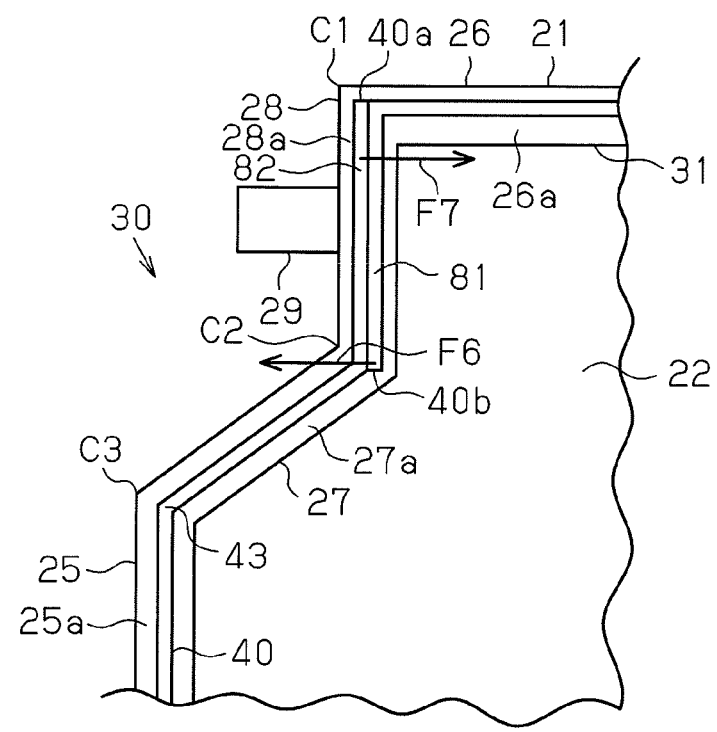
FIG. 6 is an enlarged, partial plan view showing an inner overlapping portion and an outer overlapping portion in a modified example.

As shown in FIG. 6, an inner overlapping portion 81 and an outer overlapping portion 82 may be arranged on the third side wall 28. In this case, resilient force F6 and resilient force F7 respectively act on the inner overlapping portion 81 and the outer overlapping portion 82 in directions extending toward each other. This improves the adhesion of the inner overlapping portion 81 and the outer overlapping portion 82.

The inner overlapping portion 57 and the outer overlapping portion 58 may be arranged on the second side wall 25 or the lower wall 23. More specifically, the inner overlapping portion 57 and the outer overlapping portion 58 may be arranged at any location on the end surfaces 23a to 28a surrounding the opening 31.

The opening 31 may be shaped to have any form such as a tetragon or a pentagon.

Multiple seals 40 may be used. In this case, the portions where the seals 40 overlap each other serve as the inner overlapping portion 57 and the outer overlapping portion 58. Further, as the number of the seals 40 increases, the number of the inner overlapping portion 57 and the outer overlapping portion 58 increases.

The invention claimed is:

1. A battery pack comprising:
a plurality of battery cells; and
a battery pack case that accommodates the plurality of battery cells, the battery pack case accommodating a plurality of battery modules, wherein each battery module is comprised of a grouping of battery cells that are disposed in parallel, wherein the battery pack case includes:
a case body including an opening,
a lid fixed to the case body, wherein the lid closes the opening, and
an elongated, resilient elastic seal held between the lid and an end surface of the case body surrounding the opening, wherein the seal is bent in conformance with the shape of the opening, wherein the seal includes:
an inner overlapping portion,
an outer overlapping portion overlapped with the inner overlapping portion defining a seal overlap region, wherein the outer overlapping portion is located toward the outer side from the inner overlapping portion, and
an inner bent portion that produces resilient force acting on the inner overlapping portion so that the inner overlapping portion is pushed against the outer overlapping portion,
wherein:

the inner bent portion is bent in conformance with a corner of the case body, the outer overlapping portion includes a distal end formed in a straight shape, the outer overlapping portion is configured to adhere to the inner bent portion, and an inner side surface of the outer overlapping portion is configured to adhere to and directly contact an outer side surface of the inner overlapping portion throughout the seal overlap region.

2. The battery pack according to claim 1, wherein the seal includes an outer bent portion that produces resilient force acting on the outer overlapping portion that pushes the outer overlapping portion against the inner overlapping portion.

3. The battery pack according to claim 1, wherein the inner overlapping portion and the outer overlapping portion are located at an uppermost portion of the case.

4. The battery pack according to claim 3, wherein the outer overlapping portion covers the inner bent portion.

5. The battery pack according to claim 1, wherein the battery pack case includes a recess that is recessed toward an inner side of the battery pack case, the recess defines a region outside the battery pack case where a connector is electrically connected to the plurality of battery cells, and among walls of the battery pack case defining the recess, the inner overlapping portion and the outer overlapping portion are arranged on an end surface of a wall that differs from a wall on which the connector is arranged.

6. The battery pack according to claim 1, wherein the inner overlapping portion extends toward an upper side in a vertical direction, and the outer overlapping direction extends toward a lower side in the vertical direction.

7. The battery pack according to claim 1, wherein the elastic seal bent in conformance with the shape of the opening has a spring force.

8. A battery pack comprising:

a plurality of battery cells; and a battery pack case that accommodates the plurality of battery cells, wherein the battery pack case includes:

a case body including an opening, a lid fixed to the case body, wherein the lid closes the opening, and an elongated, elastic seal held between the lid and an end surface of the case body surrounding the opening, wherein the seal is bent in conformance with the shape of the opening, wherein the seal includes:

an inner overlapping portion, an outer overlapping portion overlapped with the inner overlapping portion defining a seal overlap region, wherein the outer overlapping portion is located toward the outer side from the inner overlapping portion, and an inner bent portion that produces resilient force acting on the inner overlapping portion so that the inner overlapping portion is pushed against the outer overlapping portion, wherein:

the inner bent portion is bent in conformance with a corner of the case body, the outer overlapping portion includes a distal end formed in a straight shape, the outer overlapping portion is configured to adhere to the inner bent portion, and an inner side surface of the outer overlapping portion is configured to adhere to and directly contact an outer side surface of the inner overlapping portion throughout the seal overlap region.

9. A battery pack comprising:

a plurality of battery cells; and a battery pack case that accommodates the plurality of battery cells, wherein the case includes:

a case body including an opening, a lid fixed to the case body, wherein the lid closes the opening, and an elongated, elastic seal held between the lid and an end surface of the case body surrounding the opening, wherein the seal is bent in conformance with the shape of the opening, wherein the seal includes an inner overlapping portion, an outer overlapping portion overlapped with and in direct contact with the inner overlapping portion defining a seal overlap region, wherein the outer overlapping portion is located toward the outer side from the inner overlapping portion, and an inner bent portion that produces resilient force acting on the inner overlapping portion so that the inner overlapping portion is pushed against the outer overlapping portion, wherein the seal comprises first and second terminal ends, and wherein the inner overlapping portion is at the first terminal end and the outer overlapping portion is at the second terminal end, and wherein an inner side surface of the outer overlapping portion is configured to adhere to and directly contact an outer side surface of the inner overlapping portion throughout the seal overlap region.

10. The battery pack according to claim 1, wherein the battery pack case includes a lower wall, which is located at a lower side of the battery pack case in a vertical direction, and an upper wall, which is located at an upper side of the battery pack case in the vertical direction, the battery modules are mounted on the lower wall, the inner overlapping portion is arranged along the upper wall, and the outer overlapping portion is located above the inner bent portion in the vertical direction.

11. The battery pack according to claim 1, wherein, within the seal overlap region, no member is arranged between the inner side surface of the outer overlapping portion and the outer side surface of the inner overlapping portion.

12. The battery pack according to claim 8, wherein, within the seal overlap region, no member is arranged between the inner side surface of the outer overlapping portion and the outer side surface of the inner overlapping portion.

13. The battery pack according to claim 9, wherein, within the seal overlap region, no member is arranged between the inner side surface of the outer overlapping portion and the outer side surface of the inner overlapping portion.

* * * * *